(12) United States Patent
Claus et al.

(10) Patent No.: US 8,376,622 B2
(45) Date of Patent: Feb. 19, 2013

(54) DEVICE FOR DETECTING AND MONITORING DAMAGE TO ANTI-FRICTION BEARINGS

(75) Inventors: Wolfgang Claus, Lippstadt (DE); Wolfgang Werther, Lippstadt (DE)

(73) Assignee: Rothe Erde GmbH, Dortmund (DE)

( * ) Notice: Subject to any disclaimer, the term of this patent is extended or adjusted under 35 U.S.C. 154(b) by 630 days.

(21) Appl. No.: 12/596,519

(22) PCT Filed: Apr. 2, 2008

(86) PCT No.: PCT/EP2008/002605
§ 371 (c)(1),
(2), (4) Date: Oct. 19, 2009

(87) PCT Pub. No.: WO2008/135123
PCT Pub. Date: Nov. 13, 2008

(65) Prior Publication Data
US 2010/0058868 A1    Mar. 11, 2010

(30) Foreign Application Priority Data
May 4, 2007 (DE) .......................... 10 2007 020 938

(51) Int. Cl.
*F16C 32/00* (2006.01)
*H02J 7/00* (2006.01)
*G01R 33/14* (2006.01)
*G01N 27/82* (2006.01)

(52) U.S. Cl. ......... 384/448; 320/108; 324/222; 324/240

(58) Field of Classification Search .................. 384/448; 73/808, 810, 862.322; 324/205, 219, 222, 324/239, 240, 241, 242, 243, 244, 258, 263; 320/108
See application file for complete search history.

(56) References Cited

U.S. PATENT DOCUMENTS

| | | | |
|---|---|---|---|
| 4,798,299 A * | 1/1989 | Bayer et al. | 212/282 |
| 5,074,677 A * | 12/1991 | Andree et al. | 384/448 |
| 5,226,736 A * | 7/1993 | Becker et al. | 384/448 |
| 5,503,030 A * | 4/1996 | Bankestrom | 73/862.627 |
| 6,161,962 A * | 12/2000 | French et al. | 384/459 |
| 7,164,265 B2 * | 1/2007 | Giai et al. | 324/174 |
| 7,493,831 B2 * | 2/2009 | Varonis | 73/862.333 |
| 2004/0025595 A1 * | 2/2004 | Brennan | 73/787 |
| 2007/0126422 A1 * | 6/2007 | Crouch et al. | 324/240 |

FOREIGN PATENT DOCUMENTS

| | | |
|---|---|---|
| DE | 102005053335 A1 * | 5/2007 |
| DE | 102007020940 B3 * | 12/2008 |
| EP | 0 529 354 | 3/1993 |
| EP | 0 637 734 A1 | 2/1995 |
| WO | WO 2006/083736 | 8/2006 |

* cited by examiner

*Primary Examiner* — Richard W Ridley
*Assistant Examiner* — Adam D Rogers
(74) *Attorney, Agent, or Firm* — McGlew and Tuttle, P.C.

(57) ABSTRACT

The invention relates to a device for detecting and monitoring damage to races or adjacent regions of bearing rings (1, 2, 3) of anti-friction bearings. The device includes a measuring device, disposed in the anti-friction bearing chamber, having a sensor and structure for supplying sensor measurement data to the outside. The device has an energy source, which is also disposed in the anti-friction roller bearing chamber and which comprises a first coil (16) for the measuring device and a second coil (18) disposed outside the anti-friction bearing chamber and destined for inductive transfer of electrical energy to the first coil (16). The second coil (18) extends only over a part of the bearing circumference and the energy source comprises an energy accumulator (19) connected to the first coil (16).

20 Claims, 5 Drawing Sheets

__US 8,376,622 B2__

DEVICE FOR DETECTING AND MONITORING DAMAGE TO ANTI-FRICTION BEARINGS

CROSS REFERENCE TO RELATED APPLICATIONS

This application is a United States National Phase application of International Application PCT/EP2008/002605 and claims the benefit of priority under 35 U.S.C. § 119 of German Patent Application DE 10 2007 020 938.1 filed May 4, 2007, the entire contents of which are incorporated herein by reference.

FIELD OF THE INVENTION

The invention relates to a device for detecting and monitoring of damage to anti-friction bearings.

BACKGROUND OF THE INVENTION

For various applications, more particularly for large-size anti-friction bearings employed in off-shore applications, with cranes or buoys it is purposive to provide testing appliances which, working in non-destructive manner and without requiring a disassembly of the bearing, are capable of detecting cracks at the race and/or adjacent regions of the bearing rings. With a prior art device of the initially designated species (EP 0 529 354 B1), detecting and monitoring of damage to races or the like is accomplished by the aid of a measuring device arranged in the anti-friction bearing chamber and having sensors supplied with operating energy in contact-less manner from the outside by way of inductive means. For this purpose, a first coil acting as energy source is arranged in the anti-friction bearing chamber to supply the required electrical energy to the measuring device, whereas an induction coil connectible to an exterior power net and inductively coupled to the first coil is provided in one of the bearing rings, said induction coil being located in a circumferential groove open towards the anti-friction bearing chamber and extending over the entire bearing circumference. A uniform and even transfer of energy to the first coil is thus made possible irrespective of the momentary position of the bearing rings.

However, such devices are considered expensive in that the circumferential groove destined to accommodate the induction coil must be configured in the mostly hardened area of the relevant bearing ring, the area facing the anti-friction bearing chamber. In case the bearings are of a type that does not permit two complete revolutions in one direction or another during the measurement, but still call for monitoring the complete bearing rings, it is necessary to provide for several measuring devices. To avoid reciprocal interferences on transmission of data, it is expedient to provide a number of induction coils and a corresponding number of circumferential grooves that corresponds to the number of measuring devices, which multiplies expenditure and cost involved. Irrespective thereof, it is only possible to accommodate a maximum of two induction coils for lack of space, thus entailing restrictions with regard to measuring possibilities.

SUMMARY OF THE INVENTION

Now, therefore, it is the object of the present invention to configure the device of the initially designated species in such a manner that it can be manufactured at less expenditure, thus being less costly and requiring no circumferential grooves.

According to the invention, a device is provided for detecting and monitoring damage to races or adjacent regions of bearing rings of anti-friction bearings. The device comprises a measuring device disposed in the anti-friction bearing chamber. The invention also relates to a combination anti-friction bearing and device for detecting and monitoring damage to races or adjacent regions of bearing rings. The measuring device is disposed at least partially in the anti-friction bearing chamber. The measuring device has a sensor for transmission of measuring signals and a sensor measurement data transmission means for transmitting measuring signals outside the anti-friction bearing chamber. The measuring device has an energy source comprising a first coil to supply the electrical energy required by the measuring device. The first coil is disposed in the anti-friction bearing chamber. The measuring device has a second coil disposed outside the anti-friction bearing chamber for inductive transfer of electrical energy to the first coil. The second coil extends only over a part of the bearing circumference. The energy source further comprises an energy accumulator connected to the first coil for storing electrical energy received by the first coil from the second coil.

The present invention bears an advantage in that the second coil only needs to be inductively coupled over a very small part of the bearing circumference to a first coil allocated to it and accommodated in the anti-friction bearing chamber. Energy transferred during the inductive coupling can be stored in an energy accumulator connected to the first coil and, if properly dimensioned, it is sufficient to take the desired measurements. Analogously it is possible to store emitted measuring data intermediately in a data memory and to transfer the data only if both coils stand opposite to each other. Therefore, the hardened area allocated to the anti-friction bearing chamber needs to be interrupted only in the area of a small bore accommodating the second coil. As the additionally required electronic components take little impact on overall costs, it results a low-cost flexibly applicable monitoring device.

The second coil may advantageously be arranged in a sleeve introduced into a bore of one of the bearing rings. The sleeve may advantageously be provided with a contact system arranged on a circumferential area of the bearing ring accommodating the sleeve, said contact system for connection to a voltage source The energy accumulator may advantageously comprise a capacitor or rechargeable battery (storage cell) and a rectifier arranged between the capacitor or rechargeable battery and the first coil.

The measuring device may advantageously be accommodated in a part of a cage for guidance and separation of anti-friction bearing bodies, said part of the cage extending over several anti-friction bearing partitions. Several measuring devices may advantageously be provided that are accommodated in several cage parts of said cage arranged in a distribution spread at the bearing circumference.

The measuring device and energy source may also be accommodated in an anti-friction bearing body configured as a measuring roll.

The measuring device may advantageously further comprise a data memory.

Transmission means may advantageously comprise inductive elements coupled to each other. The inductive elements may advantageously be the first coil and the second coil.

The invention is now elucidated in greater detail in connection with the enclosed drawings showing some embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
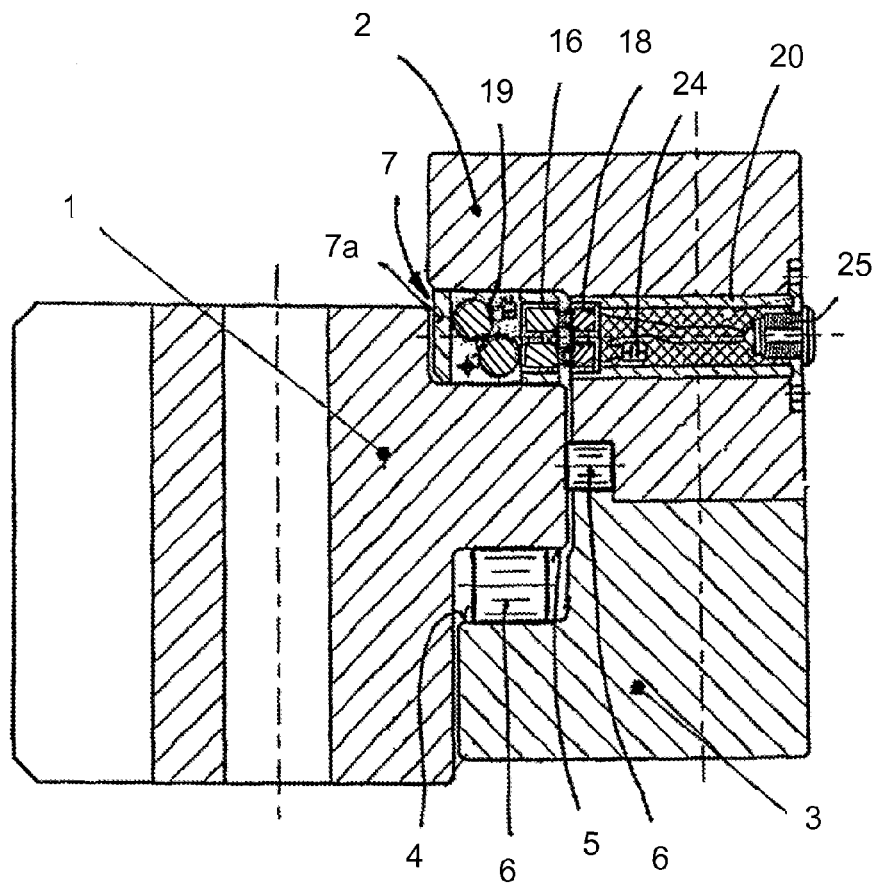
FIG. 1 is a schematic radial sectional view through an anti-friction bearing with parts of an inventive device.

Referring to the drawings in particular, the embodiment example of the inventive device as schematically represented in FIG. 1 shows a large-size anti-friction bearing comprised of a turnable bearing ring 1, a stationary bearing ring 2, and a retainer ring 3 which is rigidly connected to the afore-mentioned rings, in between of which anti-friction bearing chambers are provided at three levels. These anti-friction bearing chambers are bordered by races 4, 5 for anti-friction bearing bodies 6 here configured as cylinder rolls. Moreover, to guide and separate the anti-friction bearing bodies 6, cages 7 are provided for in the anti-friction bearing chambers as shown in FIG. 1 for the uppermost level only, the cages having webs 7a engaging between the anti-friction bearing bodies 6. Races 4 and 5 as well as the adjacent areas, more particularly the transitions between races 4, 5 and the bearing rings, are basically provided with a hardening layer.

Figure 2:
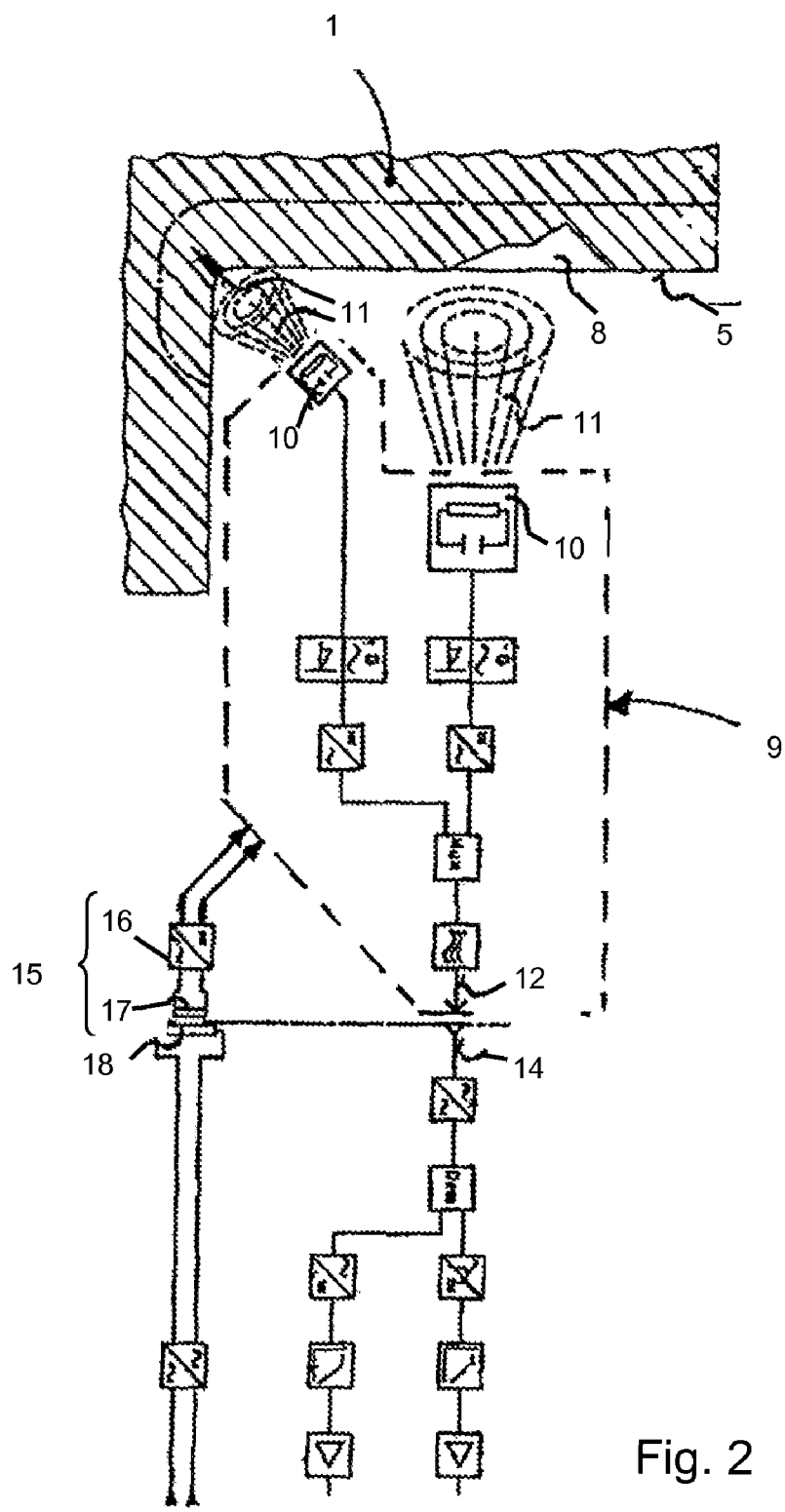
FIG. 2 is a schematic view showing the set-up of a measuring appliance of the device according to FIG. 1.

To monitor races 4 and 5 as well as the adjacent areas and to detect eruptions and cracks 8 (FIG. 2) developing in them, an electrical measuring device 9 is accommodated in at least one of the anti-friction bearing chambers, more particularly in a web 7a of one of the cages 7. The measuring device at least comprises one sensor 10 which in the embodiment example shown here is configured as a high-frequency coil that closely stands opposite to one of the races 4, 5 or to an adjacent area as shown in FIG. 2, with an air gap being formed, and which generates a high-frequency electromagnetic alternating field 11 that entails eddy currents in races 4, 5 and transitions made of steel. The magnetic coupling thus produced entails an attenuation of an oscillating circuit of measuring device 9, the oscillating circuit comprising sensor 10, and the attenuation being dependent upon the variation in the air gap. The variation in amplitude resulting hereof determines the magnitude of measuring signals.

Conditioning and treatment of these measuring signals is executed in an electrical circuit configuration of measuring device 9, the electrical circuit configuration being connected to sensor 10 and the components of which being accommodated in the same or in an adjacent web of the relevant cage 7, depending on prevailing space conditions. Finally, the measuring device 9 is comprised of a means, here configured as a sending aerial 12, for transmission of measuring signals to the exterior where the measuring signals are picked-up, for example by means of a receiving aerial 14 accommodated in the bearing ring 2, and passed on for further processing and evaluation.

The operating energy for sensors 10 and the electrical and/or electronic components of measuring device 9 is also furnished by an energy source 15 arranged in the relevant anti-friction bearing chamber, the energy source comprising a first coil 16 mounted to the relevant cage 7 and a rectifier 17 connected to the coil. The first coil 16 extends only over a small part of the bearing circumference and it is inductively coupled to a second coil 18 arranged outside the relevant anti-friction bearing chamber, preferably in bearing ring 2, and which serves to transfer the electrical energy required by measuring device 9 from the outside inductively to the first coil 16.

Devices of the kind described hereinabove are known, for example from publication EP 0 529 354 B1 (corresponding to U.S. Pat. No. 5,226,736) which for avoidance of repetitions is hereby made an object of the present disclosure by taking reference to it. U.S. Pat. No. 5,226,736 is hereby incorporated by reference.

Figure 3:
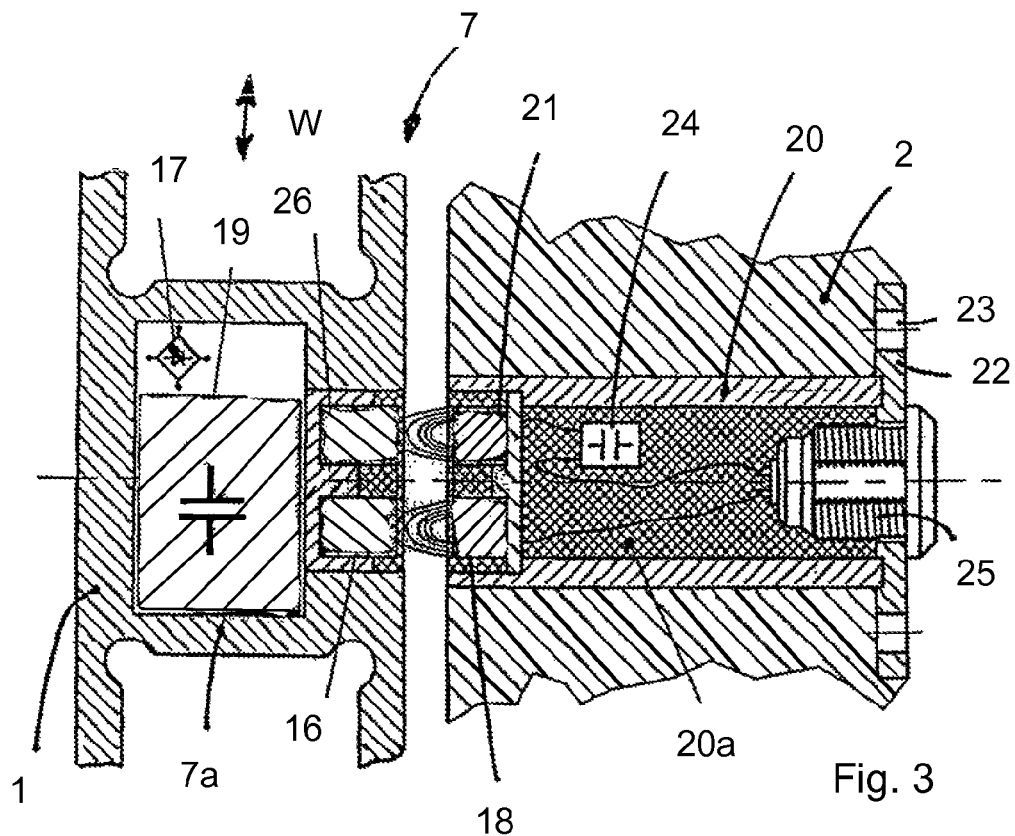
FIG. 3 is an enlarged partial cross-sectional view through the anti-friction bearing showing a first embodiment for accommodating the measuring device and a pertinent energy source of the device according to FIG. 1.
Figures 4, 5:
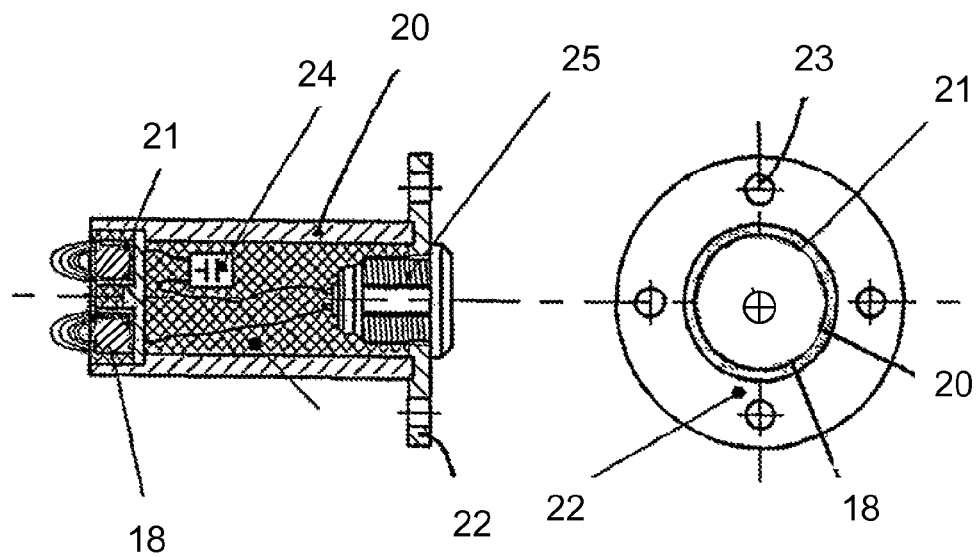
FIG. 4 is a longitudinal sectional view through a sleeve of the device according to FIG. 1, the sleeve provided with a coil.
FIG. 5 is a front-end view of the sleeve according to FIG. 4.

According to the present invention, the second coil 18 also extends only over a part of the bearing circumference, preferably over a very small part of the bearing circumference extending over a few anti-friction bearing body partitions, as is particularly shown in FIG. 3. Therefore, on turning the bearing ring 1 in the direction of the double arrow w (FIG. 3), electrical energy can only be transferred to the first coil 16 if the second coil 18 stands opposite to the first coil 16 according to FIG. 3 so that there is a sufficiently strong magnetic coupling. However, in order to assure sufficient energy supply even for those relative positions of bearing rings 1, 2 in which the coils 16, 18 are not inductively coupled, the energy source 15 is inventively provided with an energy accumulator 19 which is only indicated schematically in FIG. 3. For example, this energy accumulator 19 at least comprises a high-capacitive condenser (capacitor) or at least an accumulator (Storage cell—rechargeable battery). Thus it is achieved that the energy accumulator 19 is recharged whenever the second coil 18 approaches the first coil 16 and/or runs past it. If the time for full charging of the energy accumulator on turning the bearing is too short, the bearing ring 1 can also be held-up for a short time. Capacitors suitable for this purpose, for example, are those capacitors that are obtainable on the market under the designations "Gold Cap" or "Super Cap" and which have capacitances ranging for example from 1 F up to any beyond 100 F, depending on their size and voltage. Just to put an example, it should be noted that the energy source 15 with a capacitor of 11 F and an admissible voltage drop of 0.8 V can supply an electric current of 10 mA for a period of approx. 14 minutes to the measuring device 9.

Pursuant to FIGS. 1, 3, 4, and 5 the second coil 18 is fastened in one end of sleeve 20 and mounted on a conventional pot-shaped shell and/or ferritic core 21 or the like. At the opposite end, sleeve 20 comprises a flanged plate 22 acting as arrest stop and provided with screw holes 23 to allow for its fastening to the inside of bearing 2, for example. Furthermore, at least one equalizer capacitor 24 connected to coil 18 may be provided in the sleeve 20. Finally, the flanged plate 22 is protruded by a plug-type and/or socket-shaped contact system 25, the contacts of which are connected to coil 18, equalizer capacitor 24 and to other components, if any. In accordance with FIG. 6, such another component may be the receiving aerial 14 which is also accommodated in the sleeve 20 and which is connected to an allocated contact of contact system 25. In this case, the sending aerial 12 is preferably arranged near the first coil 16. Besides, the sleeve 20 may be filled with a grouting compound 20a.

Figure 6:
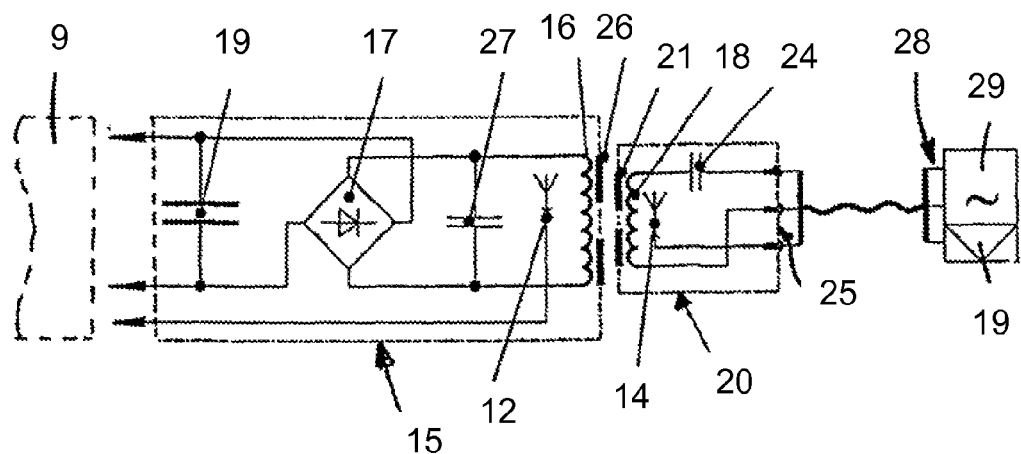
FIG. 6 is a schematic view showing an embodiment example for an electrical circuit of the energy source of the device.

FIG. 6 schematically shows the electrical circuit of energy source 15 with the first coil 16, a ferritic core 6 carrying the coil, the energy accumulator 19, rectifier 17 arranged between the energy accumulator 19 and coil 16, and a smoothening capacitor 27. The connection contacts of energy accumulator 19 are connected with inputs of the measuring device 9. The same applies to a connecting contact of sending aerial 12. Furthermore, the second coil 18 with the ferritic core 21, equalizer capacitor 24, receiving aerial 14 and contact system 25 connected to these components are recognizable from FIG. 6. As a matter of fact, the configuration is so purposive and expedient that coil 18 automatically takes the proper position for the intended energy transfer when sleeve 20 with its flanged plate 22 leans to bearing ring 2 after it has been introduced into the bore of bearing ring 2.

As is furthermore shown in FIG. 6, in case of checking the bearing for those faults outlined hereinabove, it is merely required to connect a testing appliance 28 to the contact system 25, the testing appliance comprising a power pack 29 destined for being connected to the second coil 16 and a data processing unit 30 to be linked to the receiving aerial 14, with it also being possible for the data processing unit to be a PC or a laptop. Then, by means of testing appliance 28, the alternating voltage required in a given case is supplied to the second coil 18 in order to recharge the energy accumulator 19 via the rectifier 17 by the aid of the first coil 16 whenever it runs past sleeve 20. Thereby it is ensured that the measuring device 9 receives the required direct current even in case that both coils 16, 18 do not stand opposite to each other. At the same time, by means of the data processing unit 30, the measuring data transmitted from sending aerial 12 to receiving aerial 14 can be picked-up and be directly evaluated or loaded into a data memory of the data processing unit 30 for subsequent evaluation, depending on requirements. Upon completion of the bearing check-up, the testing appliance 28 is again disconnected from the contact system. As a matter of fact, it would also be conceivable to leave the testing appliance 28 as a stationary unit at the bearing and to provide it with a connecting socket for the connecting cable of a voltage source or the like.

Unless data transmission is accomplished in radio mode, the transmission of measuring data from the sending aerial 12 to the receiving aerial 13 is basically only possible if both aerials 12, 14 are mainly exactly positioned opposite to each other. Therefore, in a further development of the present invention, it is envisaged to provide the measuring device 9 with an additional data memory in which the measuring data determined with a full (or partial) revolution of the bearing can be intermediately stored. A transmission of measuring data to the receiving aerial 14 is performed whenever both aerials 12, 14 are aligned to each other. The data memory is comprised of a memory chip adapted to a processor that controls the internal sequencing and that builds-up the communication.

Instead of a data transmission by means of aerials, it is also possible to transmit data with magnetically coupled inductive elements, with it being possible with special advantage that these inductive elements are the same coils 16 and 18 which serve for energy transfer. Such a transfer can be performed simultaneously or consecutively for better separation of data transmission from energy transfer. For example, with a simultaneous transmission and/or transfer, reactions are measured that result because of the operation of sensor 10 with regard to amplitude, phase or frequency in the currents and/or voltages of the second coil 18. Conversely, a data transmission that is independent of the energy transfer can be accomplished, for example, by arranging a third coil upstream or downstream of the first coil 16 in the direction of rotation of bearing ring 1, the third coil merely serving for data transmission and transmitting data to the second coil 18 as it runs past the second coil. Inversely, another second coil 18 might also be provided for in a manner that a data transmission and then an energy transfer (or vice versa) can be accomplished with the same first coil 16, depending on which second coil 18 momentarily stands opposite to the first coil 16. In these cases, too, the data are intermediately stored in a data memory of the measuring device 9 for as long as the relevant coils do not stand opposite to each other.

In principle, the described components of measuring device 9 can be distributed to an arbitrary number of cages 7 preferably arranged side by side and in some cases being configured as mere intermediate pieces between the anti-friction bearing bodies 6. Depending of spatial conditions, it is furthermore possible to remove individual anti-friction bearing bodies 6 to create space for the components of measuring device 9. If there are cages 7 made of plastic material, it may be expedient to remove some of these cages 7 and anti-friction bearing bodies guided by them and to install a cage made of steel into the part of the anti-friction bearing chamber thus cleared. Hereby it can be avoided that deformation, if any, of plastic cages evolving on operation takes an adverse impact on measuring accuracy.

Figure 7:
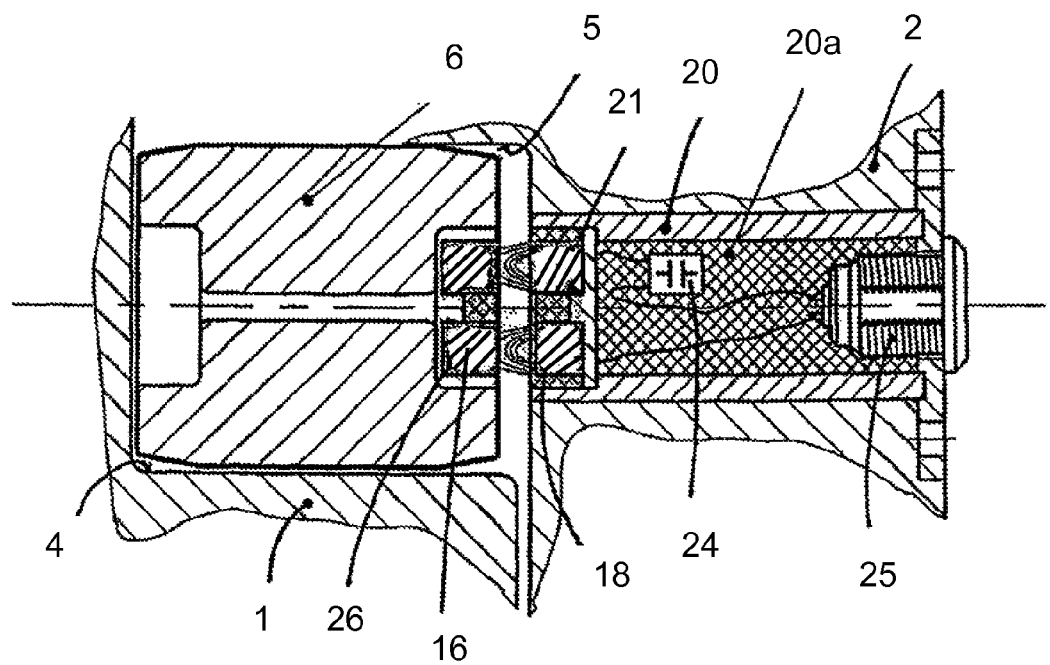
FIG. 7 is an enlarged partial cross-sectional view through the anti-friction bearing according to FIG. 1 showing a second embodiment example for accommodating the measuring device and a pertinent energy source of the device.

Alternatively it is furthermore possible to configure at least one of the anti-friction bearing bodies 6 as a measuring roll. For this purpose, the energy source 15 with the first coil 16 and the measuring device 9 connected to it and comprised of sensor 10 are accommodated in one of the anti-friction bearing bodies 6. This is schematically indicated in FIG. 7, according to which coil 16 is arranged in a front-end area of one of anti-friction bearing bodies 6, the front-end area facing the bearing ring 2, and according to which the coil 16 can rotate together with the anti-friction bearing body. The measuring device 9 and the other parts of energy source 15 are accommodated—which is not shown here—in the same anti-friction bearing body 6. Energy transfer and data transmission occur whenever the relevant anti-friction bearing bodies 6 stand opposite to the second coil 18.

Figure 8:
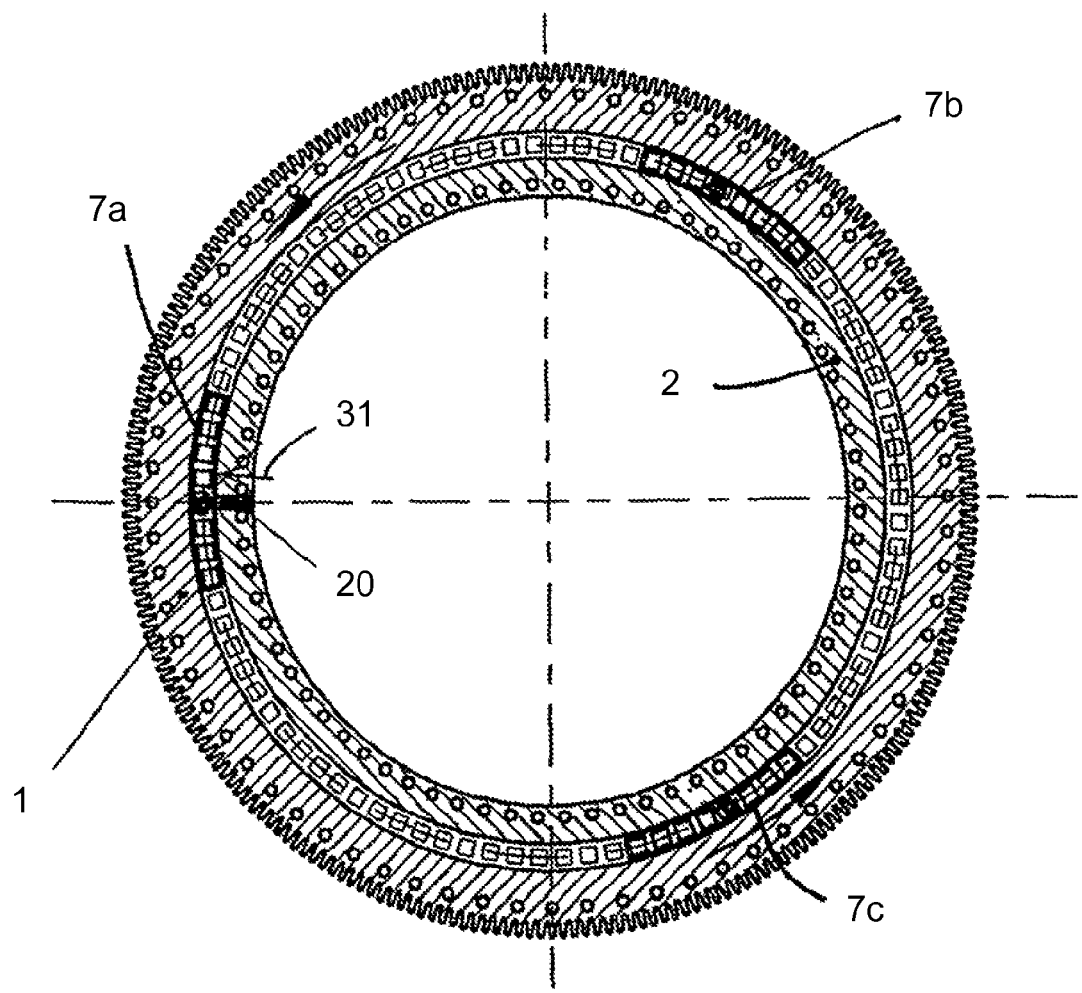
FIG. 8 is a schematic cross-sectional view through the anti-friction bearing according to FIG. 1 and an embodiment example comprised of several measuring appliances of the inventive device.

FIG. 8 shows an embodiment example of the present invention with several cages 7a, 7b, and 7c arranged at a certain spacing in the circumferential direction of the bearing and in which a separate energy source 15 each as well as a measuring device 9 linked to it are arranged. As the energy and data, in turn, are only transferred and/or transmitted at one point of the bearing circumference where the sleeve 20 with the second coil 18 is located, the various measuring devices 9 cannot influence each other reciprocally. The embodiment example shows three cages 7a, 7b, and 7c which are staggered by approx. 120° each in circumferential direction, but as a matter of fact only two or more than three cages 7, too, can be provided with energy sources and measuring devices. Theoretically, by analogy with FIG. 7, one separate energy source 15 and one measuring device 9 each might be arranged in each individual anti-friction bearing body 6.

The present invention is not restricted to the examples of embodiments described herein. In particular, this applies to the number and arrangement of the totally existing first and second coils 16, 18 and the facilities connected and linked to them. The application of several both first and second coils 16, 18 arranged at a certain spacing to each other in circumferential direction, for example, would have an advantage in that the races 4, 5 and the adjacent areas could be checked all around without it being necessary for the cages 7 to execute a full rotation. Furthermore, the aerials 12, 14 need not be integrated into the coil 16 or sleeve 20. Instead they can be arranged in another bore of bearing ring 2, the bore being spaced by a few centimeters either to the one or to the other side of sleeve 20. In FIG. 8, this is schematically indicated by a line 31. A clean separation of data transmission from energy transfer can be achieved hereby, too. Moreover, the possibilities for data transmission as outlined hereinabove should be noted as examples only, because there are other possibilities for a contact-less data transmission. Furthermore, it is obvious that measuring device 9 in principle just needs to comprise the sensor (high-frequency coil 10) and a means for transmission of measuring signals received by means of this sensor, because the complete processing and evaluation of measuring signals could also be performed with a computer or the like connected to the contact system 25. Finally, it is self-evident that the various features can be applied in combinations other than those described and outlined herein.

While specific embodiments of the invention have been described in detail to illustrate the application of the principles of the invention, it will be understood that the invention may be embodied otherwise without departing from such principles.

The invention claimed is:

1. A device for detecting and monitoring damage to races or adjacent regions of bearing rings of anti-friction bearings with an anti-friction bearing chamber and with a bearing circumference, said device being comprised of a measuring device disposed in the anti-friction bearing chamber, said device comprising:
    a sensor for transmission of measuring signals and a means for supplying sensor measurement data to outside the anti-friction bearing chamber;
    an energy source disposed in the anti-friction bearing chamber and which comprises a first coil to supply electrical energy required by the measuring device and a second coil disposed outside the anti-friction bearing chamber for inductive transfer of electrical energy to the first coil, the second coil extending only over a part of the bearing circumference and the energy source further comprising an energy accumulator connected to the first coil and said energy accumulator stores electrical energy received via said second coil and said first coil with at least a portion of said first coil is adjacent to at least a portion of said second coil.

2. A device according to claim 1, wherein the second coil is arranged in a sleeve that can be introduced into a bore of one of the bearing rings.

3. A device according to claim 2, wherein the sleeve is provided with a contact system arranged on a circumferential area of the one of the bearing rings accommodating the sleeve, with said contact system being connected to at least a voltage source.

4. A device according to claim 1, wherein the energy accumulator comprises a capacitor or rechargeable battery and a rectifier arranged between the capacitor or rechargeable battery and the first coil, said energy accumulator receiving electrical energy from said first coil with said second coil located at a spaced location from said first coil with respect to a circumferential direction of a bearing, said energy accumulator supplying at least said measuring device with electrical energy with said first coil located at a spaced location from said second coil with respect to the circumferential direction of the bearing ring, said energy accumulator being arranged in said anti-friction bearing chamber.

5. A device according to claim 1, wherein the measuring device is accommodated in a part of a cage, said part extending over several anti-friction bearing partitions and said cage for guidance and separation of anti-friction bearing bodies.

6. A device according to claim 5, wherein several measuring devices are provided that are accommodated in several cage parts of said cage arranged in a distribution spread at the bearing circumference.

7. A device according to claim 1, wherein the measuring device and the energy source are accommodated in an anti-friction bearing body configured as a measuring roll.

8. A device according to claim 1, wherein the measuring device comprises a data memory.

9. A device according to claim 8, wherein the means for supplying measuring data to the outside comprises inductive elements coupled to each other.

10. A device according to claim 9, wherein the inductive elements are the first coil and the second coil.

11. A combination anti-friction bearing and device for detecting and monitoring damage to races or adjacent regions of bearing rings, the combination comprising:
    a bearing with an anti-friction bearing chamber and with a bearing circumference;
    a measuring device disposed at least partially in the anti-friction bearing chamber, said measuring device having a sensor for transmission of measuring signals and a sensor measurement data transmission device for transmitting measuring signals outside the anti-friction bearing chamber and an energy source comprising a first coil to supply electrical energy required by the measuring device disposed in the anti-friction bearing chamber and a second coil disposed outside the anti-friction bearing chamber for inductive transfer of electrical energy to the first coil, the second coil extending only over a part of the bearing circumference, the energy source further comprising an energy accumulator connected to the first coil for storing electrical energy received by the first coil from interaction with the second coil.

12. A combination according to claim 11, wherein the second coil is arranged in a sleeve introduced into a bore of one of the bearing rings.

13. A combination according to claim 12, wherein the sleeve is provided with a contact system arranged on a circumferential area of the one of the bearing rings accommodating the sleeve, said contact system connects to a voltage source.

14. A combination according to claim 12, wherein the energy accumulator comprises a capacitor or rechargeable battery and a rectifier arranged between the capacitor or rechargeable battery and the first coil, said energy accumulator, said first coil and said second coil defining an electrical energy transmission flow path with at least a portion of said first coil located adjacent to at least a portion of said second coil, said energy accumulator receiving electrical energy via said electrical energy transmission flow path with said at least said portion of said first coil adjacent to said at least said portion of said second coil, said energy accumulator, said first coil and said second coil defining a non-electrical transmission flow path with said second coil located at a spaced location from said first coil with respect to a circumferential direction of a bearing ring, wherein said energy accumulator supplies at least said measuring device with electrical energy with said first coil located at a spaced location from said second coil with respect to the circumferential direction of the bearing ring, said energy accumulator being arranged in said anti-friction bearing chamber.

15. A combination according to claim 11, wherein the measuring device is accommodated in a part of a cage for guidance and separation of anti-friction bearing bodies, said part of the cage extending over several anti-friction bearing partitions.

16. A combination according to claim 15, wherein several measuring devices are provided that are accommodated in several cage parts of said cage arranged in a distribution spread at the bearing circumference.

17. A combination according to claim 11, wherein the measuring device and the energy source are accommodated in an anti-friction bearing body configured as a measuring roll.

18. A combination according to claim 11, wherein the measuring device further comprises a data memory.

19. A combination according to claim 18, wherein the transmission device comprises inductive elements coupled to each other.

20. A combination according to claim 19, wherein the inductive elements are the first coil and the second coil.

* * * * *